(No Model.)

A. CARRARA.
SLED.

No. 302,099. Patented July 15, 1884.

WITNESSES:
Theo. G. Hoster
C. Sedgwick

INVENTOR:
A. Carrara
BY Munn & Co
ATTORNEYS.

UNITED STATES PATENT OFFICE.

ANTONIO CARRARA, OF NEWARK, NEW JERSEY, ASSIGNOR TO HIMSELF AND ALFRED GIRARDOT, OF SAME PLACE.

SLED.

SPECIFICATION forming part of Letters Patent No. 302,099, dated July 15, 1884.

Application filed March 31, 1884. (No model.)

*To all whom it may concern:*

Be it known that I, ANTONIO CARRARA, of Newark, in the county of Essex and State of New Jersey, have invented certain new and useful Improvements in Sleds, of which the following is a full, clear, and exact description.

The object of my invention is to provide certain new and useful improvements in sleds, whereby the sleds are made more comfortable and less dangerous in coasting, and can also be used indoors or on smooth walks, roads, &c.

The invention consists in a sled provided with a hinged seat-section, means for holding the hinged section raised, and means for locking the said section in place when raised or lowered.

Reference is to be had to the accompanying drawings, forming part of this specification, in which similar letters of reference indicate corresponding parts in all the figures.

Figure 1:
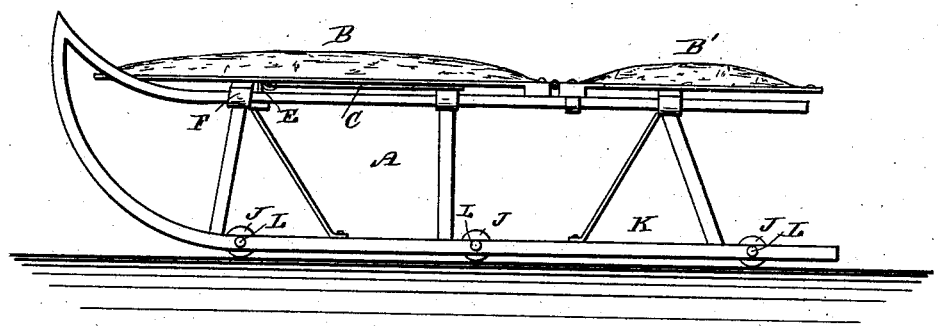
Figure 2:
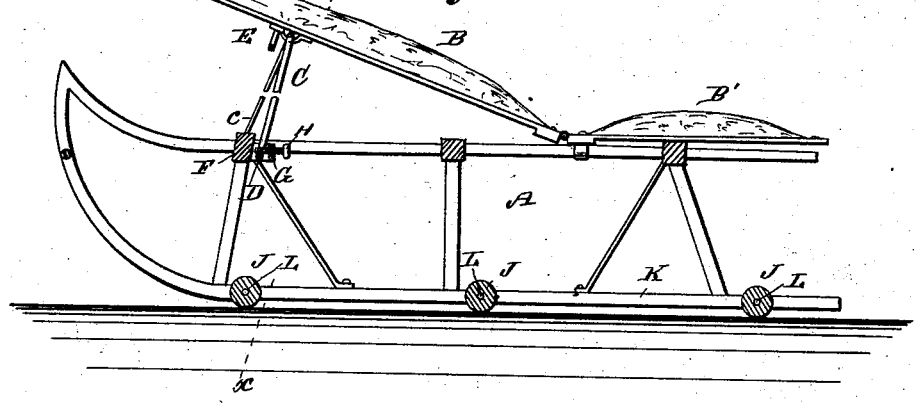
Figure 3:
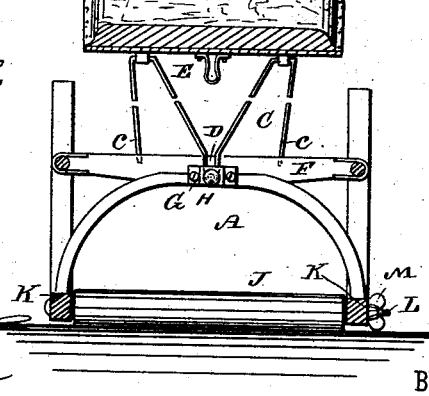

Figure 1 is a side view of my improved sled, showing the hinged part of the seat lowered. Fig. 2 is a side view showing the hinged part raised. Fig. 3 is a cross-sectional elevation on the line $x$ $x$, Fig. 2.

The seat of the sled A is formed of a front section, B, and a rear section, B'. The length of the section B is equal to about two-thirds the length of the sled, and the length of the section B' is equal to about one-third of the length of the sled. The rear section, B', is fixed to the sled, and the front section, B, is hinged to the front edge of the section B'.

To the under side of the hinged section B an M-shaped brace, C, is pivoted about one-third of the length of the section from the front end, and at the bottom of the V-shaped part of the brace C an eye or loop, D, is formed. A loop or eye, E, projects from the bottom of the hinged section B in front of the brace C. On the rear side of the front cross-bar, F, of the sled a clip, G, is fastened, in which a screw, H, is held. Rollers J, fitting between the runners K, are mounted loosely on transverse rods L, passed through the runners, which rods are held in place by winged nuts M, screwed on the ends.

When the section B is folded down, the brace C is folded against the under side of the section B, the eye E is passed in between the clip G and the bar F, and the screw H is passed through the eye E, thus holding the section B in place. If the section B is to be raised, the eye E is disengaged from the screw, the section is raised, and the ends $c$ of the brace C are placed on the bar F, and the eye D is passed in between the bar F and the clip G, and the screw H is passed through the eye D. When the section B is raised and locked in position, as shown in Fig. 2, the sled will be less dangerous and more convenient for coasting than ordinary sleds.

The rollers J can easily be removed from the sled or held on the same. If the sled is provided with the rollers, it can be used indoors, on sidewalks, &c.

In place of the brace C, any other suitable brace can be used for holding the section B raised.

Having thus described my invention, I claim as new and desire to secure by Letters Patent—

1. A sled having part of its seat hinged and adapted to be raised at one end, substantially as herein shown and described.

2. The combination, with a sled, of a seat formed of two sections, the forward one of which is hinged to the rear one, and a brace for holding the hinged section raised, substantially as herein shown and described.

3. The combination, with a sled having its seat formed of two sections, one of which is hinged, of a brace pivoted to the under side of the hinged section, an eye or loop projecting from under side of the same, and a clamping device secured to the cross-bar of the sled, substantially as herein shown and described.

4. The combination, with a sled having the hinged seat-section B, of the brace C, hinged to the under side of the said section, substantially as herein shown and described.

5. The combination, with a sled, of the clip G on the front cross-bar, F, the screw H in the clip, the hinged seat-section B, the brace C, hinged to the under side of the section B, which brace has an eye, D, and of the eye E, secured to the under side of the section B, substantially as herein shown and described.

6. The combination, with a sled, of the clip G on the front cross-bar, F, the screw H in the clip G, and the eye E, secured to the under side of the section B, substantially as herein shown and described.

ANTONIO CARRARA.

Witnesses:
CLARENCE T. VAN DEREN,
J. AUG. HINCHMAN.